United States Patent
Yang et al.

(10) Patent No.: US 9,820,305 B2
(45) Date of Patent: Nov. 14, 2017

(54) COMMUNICATION METHOD AND SYSTEM USING RR-ALOHA BASED PROTOCOLS

(71) Applicants: Zeng Yang, Shanghai (CN); Qingshan Zhang, Shanghai (CN); Guoxia Zhang, Shanghai (CN)

(72) Inventors: Zeng Yang, Shanghai (CN); Qingshan Zhang, Shanghai (CN); Guoxia Zhang, Shanghai (CN)

(73) Assignee: HARMAN INTERNATIONAL INDUSTRIES, INCORPORATION, Stamford, CT (US)

( * ) Notice: Subject to any disclaimer, the term of this patent is extended or adjusted under 35 U.S.C. 154(b) by 197 days.

(21) Appl. No.: 14/773,719

(22) PCT Filed: Apr. 25, 2013

(86) PCT No.: PCT/CN2013/074711
§ 371 (c)(1),
(2) Date: Sep. 8, 2015

(87) PCT Pub. No.: WO2014/172872
PCT Pub. Date: Oct. 30, 2014

(65) Prior Publication Data
US 2016/0037561 A1    Feb. 4, 2016

(51) Int. Cl.
*H04J 3/00* (2006.01)
*H04W 74/08* (2009.01)
*H04W 84/18* (2009.01)

(52) U.S. Cl.
CPC ....... *H04W 74/0825* (2013.01); *H04W 74/08* (2013.01); *H04W 84/18* (2013.01)

(58) Field of Classification Search
CPC .............................................. H04W 74/0825
(Continued)

(56) References Cited

U.S. PATENT DOCUMENTS

| | | | |
|---|---|---|---|
| 2009/0167513 A1* | 7/2009 | Hill | G01S 5/0072 340/435 |
| 2010/0226308 A1* | 9/2010 | Haverty | H04W 72/005 370/328 |
| 2012/0120883 A1* | 5/2012 | Chen | H04W 74/08 370/329 |

FOREIGN PATENT DOCUMENTS

| | | |
|---|---|---|
| CN | 102724764 A | 10/2012 |
| EP | 2256993 A1 | 12/2010 |

OTHER PUBLICATIONS

Extended European Search Report Application No. 13882659, dated Nov. 23, 2016, 7 pages.
(Continued)

*Primary Examiner* — Shripal Khajuria
(74) *Attorney, Agent, or Firm* — Artegis Law Group, LLP

(57) ABSTRACT

A communication method and system in an Ad-Hoc network using a RR-ALOHA based protocol are provided. The method may include: receiving a data frame which includes N slots, where N is a positive integer greater than two, where a slot includes a payload and a frame information field, where a frame information field includes N sub-frame information fields which correspond to the N slots, respectively, where a sub-frame information field includes a source temporary identifier field for indicating which node occupies its corresponding slot; and if a source temporary identifier field contained in the received data frame equals to a first predetermined value representing the status of free, determining that a corresponding slot is free and can be reserved. By using the method of the disclosure, communication efficiency is improved.

20 Claims, 4 Drawing Sheets

(58) Field of Classification Search
 USPC .......................................................... 370/336
 See application file for complete search history.

(56) References Cited

OTHER PUBLICATIONS

Riccardo Scopigno et al. "Mobile Slotted Aloha for Vanets", Vehiculat Technology Conference Fall (VTC 2009-Fall), 2009 IEEE, 70th, IEEE, Piscataway, NJ, USA, Sep. 20, 2009, pp. 1-5, XP031600160, ISBN: 978-1-4244-2514-3.

Ruilin Liu et al., "Marr-Aloha: A mobility adaptive variety of RR-Aloha for vehicular as-hoc networks", Consumer Electronics, Communications and Networks (CECNET), 2012 2nd International Conference ON, IEEE, Apr. 21, 2012, pp. 3304-3309, XP032181891, DOI: 10.1109/CECNET. 2012.6201688, ISBN: 978-1-4577-1414-6.

"Intelligent Transport Systems (ITS); Performance Evaluation of Self-Organizing TDMA as Medium Access Control Method Applied to ITS; Access Layer Part", Technical Report, European Telecommunications Standards Institute (ETSI), 650, Route Des Lucioles; F-06921 Sophia-Antipolis; France, vol. ITS WG4, No. V1.1.1, 1 Dec. 1, 2011, XP014069190, Channel access procedure for MS-Aloha; paragraph [07.3]-paragraph [7.3.2.2].

Intelligent Transport Systems (ITS); "Performance Evaluation of Self-Organizing TDMA as Medium Access Control Method Applied to ITS" Access Layer Part, ETSI TR 102 862 VI.I.I, Dec. 2011, Section 7.3.

International Search Report for Application No. PCT/CN2013/074711 dated Feb. 6, 2014.

\* cited by examiner

COMMUNICATION METHOD AND SYSTEM USING RR-ALOHA BASED PROTOCOLS

CROSS-REFERENCE TO RELATED APPLICATIONS

The present application is a national stage application of international application number PCT/CN2013/074711 titled, "COMMUNICATION METHOD AND SYSTEM USING RR-ALOHA BASED PROTOCOLS," filed on Apr. 25, 2013. The subject matter of this related application is hereby incorporated herein by reference.

TECHNICAL FIELD

The present disclosure generally relates to communication systems and methods thereof using RR-ALOHA based protocols, more particularly, to inter-vehicle communication systems and methods thereof.

BACKGROUND

RR-ALOHA based protocols are designed for inter-vehicle communication in Vehicular Ad-Hoc Networks (VANETs). RR-ALOHA based protocols require various control overheads, such as Frame Information (FI). Vehicles in Vehicular Ad-Hoc Networks may obtain status of time slots based on FI. However, conventional FI would increase the number of bits of an overhead and the increase is about the square of the number of time slots, which reduces the communication efficiency. Therefore, there is a need for new FI to improve communication efficiency.

SUMMARY

In one embodiment of the present application, a method for determining whether a slot is free in an Ad-Hoc network using a RR-ALOHA based protocol is provided. The method may include: receiving a data frame which includes N slots, where N is a positive integer greater than two, where a slot includes a payload and a frame information field, where a frame information field includes N sub-frame information fields which correspond to the N slots, respectively, where a sub-frame information field includes a source temporary identifier field for indicating which node occupies its corresponding slot; and if a source temporary identifier field contained in the received data frame equals to a first predetermined value representing the status of free, determining that a corresponding slot is free and can be reserved.

In one embodiment of the present application, a method for determining whether a slot is free in an Ad-Hoc network using a RR-ALOHA based protocol is provided. The method may include: receiving a data frame which includes N slots, where N is a positive integer greater than two, where a slot includes a payload and a frame information field, where a frame information field includes N sub-frame information fields which correspond to the N slots, respectively, where a sub-frame information field includes a source temporary identifier field for indicating which node occupies its corresponding slot; and if all source temporary identifier fields corresponding to a first slot, contained in the received data frame, equal to a first predetermined value representing the status of free, determining that the first slot is free and can be reserved.

In some embodiments, the method may further include: if a source temporary identifier field corresponding to a first slot, contained in the received data frame, equals to a second predetermined value representing the status of collision, determining that there is collision on reservation of the first slot.

In some embodiments, the method may further include: if all source temporary identifier fields corresponding to a first slot, contained in the received data frame, equal to a third predetermined value representing the status of hop limit reached, determining that a hop limit is reached and the first slot can be reserved.

A hop is typically the distance a signal can reach without being relayed. In some embodiments, the hop limit may be a third hop.

In one embodiment of the present application, a method for generating a source temporary identifier field in an Ad-Hoc network using a RR-ALOHA based protocol is provided. The method may include: a first node receiving a data frame which includes N slots, where N is a positive integer greater than two, where a slot includes a payload and a frame information field, where a frame information field includes N sub-frame information fields which correspond to the N slots, respectively, where a sub-frame information field includes a source temporary identifier field for indicating which node occupies its corresponding slot; and if all source temporary identifier fields corresponding to a first slot, contained in the received data frame indicating that the first slot is free, generating a source temporary identifier field corresponding to the first slot having a first predetermined value representing the status of free, which source temporary identifier field is to be transmitted on a second slot reserved by the first node.

In some embodiments, the method may include: if a first source temporary identifier field contained in the received data frame indicating that a first slot is occupied by a second node and a second source temporary identifier field contained in the received data frame indicating that the first slot is occupied by a third node, generating a source temporary identifier field corresponding to the first slot having a second predetermined value representing the status of collision, which source temporary identifier field is to be transmitted on a second slot reserved by the first node.

In some embodiments, if all the source temporary identifier fields corresponding to the first slot equal to a first predetermined value representing the status of free, or if all the source temporary identifier fields corresponding to the first slot equal to a third predetermined value representing the status of hop limit reached, or if some of the source temporary identifier fields corresponding to the first slot equal to the first predetermined value and the rest source temporary identifier fields corresponding to the first slot equal to the third predetermined value, it indicates that the first slot is free and can be reserved.

In some embodiments, the RR-ALOHA based protocol may be one of a RR-ALOHA protocol, a RR-ALOHA+ protocol and a MS-ALOHA protocol.

In one embodiment of the present application, a system for determining whether a slot is free in an Ad-Hoc network using a RR-ALOHA based protocol is provided. The system may include a communication device for receiving data frames, where a data frame includes N slots, where N is a positive integer greater than two, where a slot includes a payload and a frame information field, where a frame information field includes N sub-frame information fields which correspond to the N slots, respectively, where a sub-frame information field includes a source temporary identifier field for indicating which node occupies its corresponding slot; and a processing device configured to determine that a slot is free and can be reserved if a source temporary identifier field corresponding to the slot contained in a data frame received by the communication device equals to a first predetermined value representing the status of free.

In one embodiment of the present application, a system for determining whether a slot is free in an Ad-Hoc network using a RR-ALOHA based protocol is provided. The system may include a communication device for receiving data frames, where a data frame includes N slots, where N is a positive integer greater than two, where a slot includes a payload and a frame information field, where a frame information field includes N sub-frame information fields which correspond to the N slots, respectively, where a sub-frame information field includes a source temporary identifier field for indicating which node occupies its corresponding slot; and a processing device configured to determine that a first slot is free and can be reserved if all source temporary identifier fields corresponding to the first slot, contained in a data frame received by the communication device, equal to a first predetermined value representing the status of free.

In some embodiments, the processing device may be configured to: if a source temporary identifier field corresponding to a first slot, contained in the received data frame, equals to a second predetermined value representing the status of collision, determine that there is collision on reservation of the first slot.

In some embodiments, the processing device may be configured to: if all source temporary identifier fields corresponding to a first slot, contained in the received data frame, equal to a third predetermined value representing the status of hop limit reached, determine that a hop limit is reached and the first slot can be reserved. In some embodiments, the hop limit may be a third hop.

In one embodiment of the present application, a system for generating a source temporary identifier field in an Ad-Hoc network using a RR-ALOHA based protocol is provided. The system may include a communication device for receiving data frames, where a data frame includes N slots, where N is a positive integer greater than two, where a slot includes a payload and a frame information field, where a frame information field includes N sub-frame information fields which correspond to the N slots, respectively, where a sub-frame information field includes a source temporary identifier field for indicating which node occupies its corresponding slot; and a processing device configured to generate a source temporary identifier field corresponding to a first slot having a first predetermined value representing the status of free, which source temporary identifier field is to be transmitted on a second slot reserved by a node on which the system is mounted, if all source temporary identifier fields corresponding to the first slot, contained in a data frame received by the communication device indicate that the first slot is free.

In some embodiments, if a first source temporary identifier field contained in the received data frame indicating that a first slot is occupied by a first node and a second source temporary identifier field contained in the received data frame indicating that the first slot is occupied by a second node, generate a source temporary identifier field corresponding to the first slot having a second predetermined value representing the status of collision, which source temporary identifier field is to be transmitted on a second slot reserved by the node.

In some embodiments, if all the source temporary identifier fields corresponding to the first slot equal to a first predetermined value representing the status of free, or if all the source temporary identifier fields corresponding to the first slot equal to a third predetermined value representing the status of hop limit reached, or if some of the source temporary identifier fields corresponding to the first slot equal to the first predetermined value and the rest source temporary identifier fields corresponding to the first slot equal to the third predetermined value, it indicates that the first slot is free and can be reserved.

In one embodiment of the present application, a system for determining whether a slot is free in an Ad-Hoc network using a RR-ALOHA based protocol is provided. The system may include a communication device for receiving data frames, where a data frame includes N slots, where N is a positive integer greater than two, where a slot includes a payload and a frame information field, where a frame information field includes N sub-frame information fields which correspond to the N slots, respectively, where a sub-frame information field includes a source temporary identifier field for indicating which node occupies its corresponding slot; and a processing device configured for determining that a slot is free and can be reserved if a source temporary identifier field corresponding to the slot contained in a data frame received by the communication device equals to a first predetermined value representing the status of free.

In one embodiment of the present application, a system for determining whether a slot is free in an Ad-Hoc network using a RR-ALOHA based protocol is provided. The system may include a communication device for receiving data frames, where a data frame includes N slots, where N is a positive integer greater than two, where a slot includes a payload and a frame information field, where a frame information field includes N sub-frame information fields which correspond to the N slots, respectively, where a sub-frame information field includes a source temporary identifier field for indicating which node occupies its corresponding slot; and a processing device configured for determining that a first slot is free and can be reserved if all source temporary identifier fields corresponding to the first slot, contained in a data frame received by the communication device, equal to a first predetermined value representing the status of free.

In one embodiment of the present application, a system for generating a source temporary identifier field in an Ad-Hoc network using a RR-ALOHA based protocol is provided. The system may include a communication device for receiving data frames, where a data frame includes N slots, where N is a positive integer greater than two, where a slot includes a payload and a frame information field, where a frame information field includes N sub-frame information fields which correspond to the N slots, respectively, where a sub-frame information field includes a source temporary identifier field for indicating which node occupies its corresponding slot; and a processing device configured for generating a source temporary identifier field corresponding to a first slot having a first predetermined value representing the status of free, which source temporary identifier field is to be transmitted on a second slot reserved by a node on which the system is mounted, if all source temporary identifier fields corresponding to the first slot, contained in a data frame received by the communication device indicate that the first slot is free.

In some embodiments, the RR-ALOHA based protocol may be one of a RR-ALOHA protocol, a RR-ALOHA+ protocol and a MS-ALOHA protocol.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
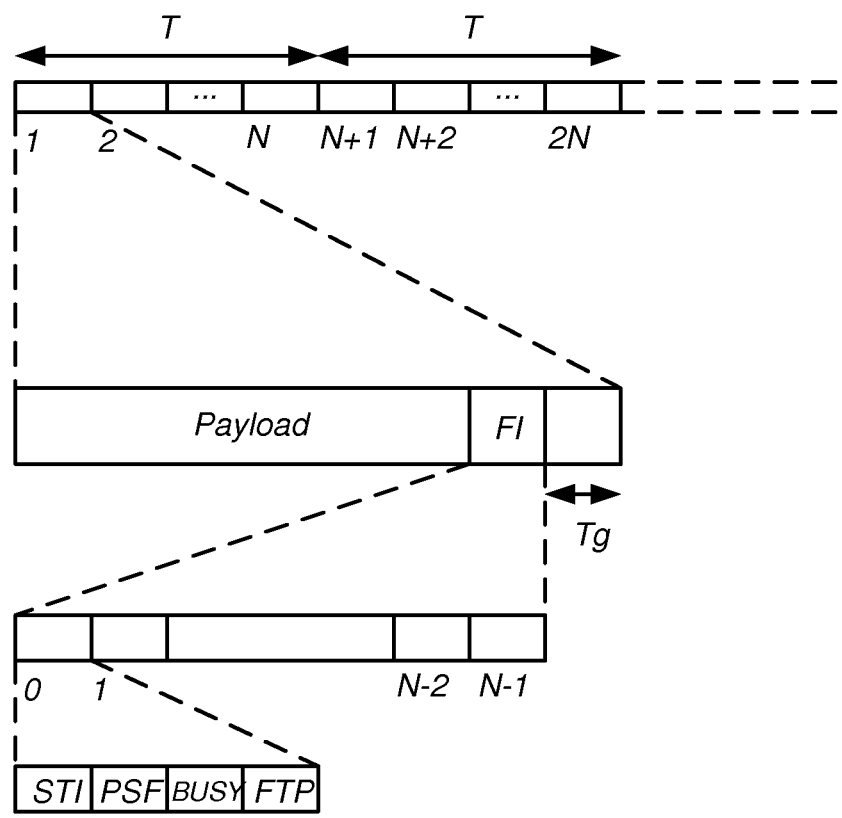
FIG. 1 illustrates a schematic data frame structure of the RR-ALOHA protocol according to the conventional art.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Typically, RR-ALOHA based protocols may include three different versions, which include a RR-ALOHA protocol, a RR-ALOHA+ protocol and a MS-ALOHA protocol.

For better understanding embodiments of the present disclosure, RR-ALOHA based protocols may be described with reference to FIG. 1 and FIG. 2. FIG. 1 illustrates a schematic data frame structure of RR-ALOHA protocol according to the conventional art. Referring to FIG. 1, time is divided into a number of data frames. Each data frame may have a period of T and is subdivided into a plurality of N slots. N is a positive integer greater than two. In some embodiments, each slot may have a same duration. Nodes in a Vehicular Ad-Hoc Network (e.g., vehicles) may need a slot as its basic channel (BCH) for transmission.

Referring to FIG. 1, a slot may include a payload, a frame information (FI) field and a Guard Time (Tg) field. A frame information field includes N sub-frame information fields which correspond to the N slots, respectively. For example, referring to FIG. 1, the sub-frame information field labeled "0" (FI 0) corresponds to slot 1, and the sub-frame information field labeled "1" (FI 1) corresponds to slot 2, and so on.

The FI may be used to indicate status of a slot corresponding to a sub-frame information field (hereinafter, referred to as a corresponding slot). For example, vehicles in the network may know from its received FIs which vehicle occupies a slot corresponding to a sub-frame information field.

In some embodiments, a sub-frame information field may have a same configuration, including a plurality of fields. One field of a sub-frame information field may be referred to as a Source Temporary Identifier (STI) field, for indicating which vehicle occupies its corresponding slot. Take FI 0 for example, referring to FIG. 1, the Source Temporary Identifier (STI) field, the first field of FI 0, is configured to indicate which vehicle occupies a slot corresponding to FI 0. If FI 0 corresponds to slot 1 and slot 1 is occupied by a vehicle, FI 0 may contain an identity information of the vehicle in the STI field.

The STI field generally includes n bits, where n is a positive integer. Thus, the STI field may have $2^n$ values. In some embodiments, n is equal to 8, and the STI field has 256 values, from "00000000" to "11111111". The number of STI field values is at least equal (corresponding) to the number of slots, that is, at most 256 vehicles can be identified in the network.

As shown in FIG. 1, a sub-frame information field further includes a field formed by one bit, referred to as a BUSY bit, for indicating whether a corresponding slot is busy or free. For example, the BUSY bit may be set to "1" if its corresponding slot is occupied; otherwise, it may be set to "0". In the case where the BUSY bit is "1", the STI field indicates the identity of the vehicle occupying the corresponding slot. The RR-ALOHA protocol increase the number of bits of an overhead with a BUSY bit arranged in a sub-frame information field, which in turn reduces the communication efficiency.

In addition to STI and BUSY fields, a sub-frame information field may further include a priority status field (PSF) for indicating the priority of data transmitted on the slot, and a FTP which is used in point-to-point transmission, which are not described in detail in the present disclosure.

Figure 2:
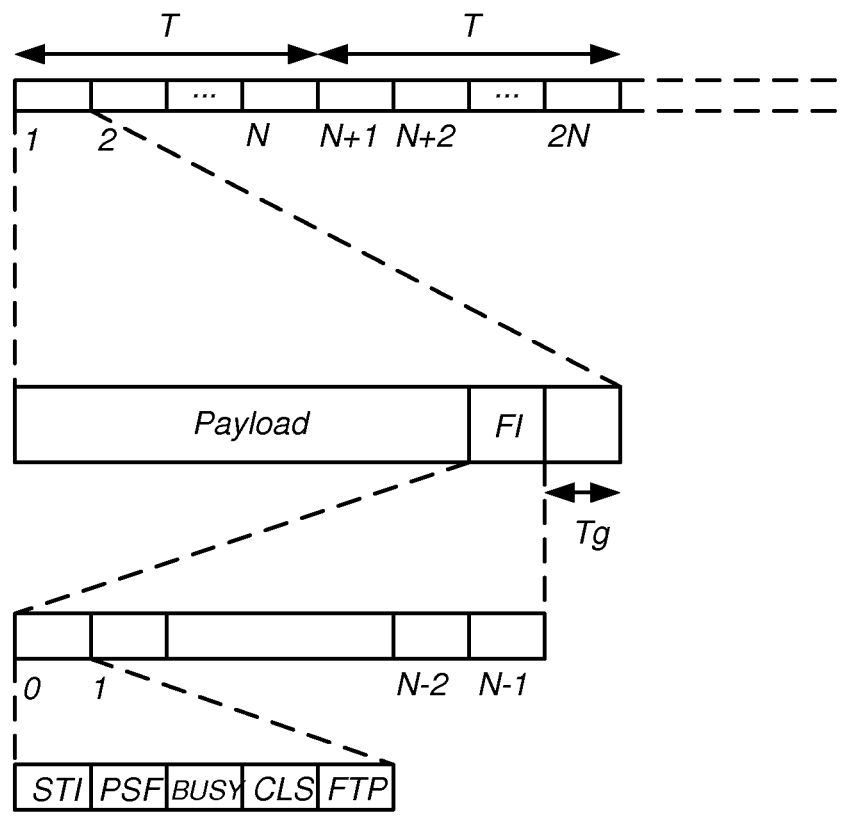
FIG. 2 illustrates a schematic data frame structure of the RR-ALOHA+ protocol according to the conventional art.

FIG. 2 illustrates a schematic data frame structure of RR-ALOHA+ protocol according to the conventional art.

As shown in FIG. 2, besides the BUSY bit, a field formed by one bit is introduced to the FI, which may be used to indicate a collision detected by a vehicle in the network (referred to as a CLS bit). In RR-ALOHA+ protocol, each vehicle is supposed to aggregate in its FI its channel sensing result and all FIs received. For example, if a vehicle receives two FIs announcing a slot is reserved by different vehicles, or if the channel sensing result contradicts the information in the received FI, the vehicle determines that there is collision on reservation of the slot. The usage of the CLS and BUSY bits is shown in Table 1.

TABLE 1

| Bit field | Meaning |
| --- | --- |
| BUSY bit = 0; CLS bit = 0 | Corresponding slot not occupied |
| BUSY bit = 1; CLS bit = 0 | Corresponding slot occupied by vehicle with STI |
| BUSY bit = 0; CLS bit = 1 | a collision |

However, a frame period is too long, that is, it can allow multiple hops. It seems meaningless since the frame information is forwarded more than two hops. So if all STI fields corresponding to a slot indicate that a third hop is reached, the slot is deemed to be free and can be reserved. The RR-ALOHA+ protocol does not consider a hop limit for the number of hops over which the frame information is forwarded, which would result in low reuse of slots. The MS-ALOHA protocol is an improvement to the RR-ALOHA+ protocol, by exploiting the fourth state in the CLS and BUSY bits, thus the problem of slot reuse limitation due to forwarding the FI beyond two hops is resolved. The usage of the fourth state in CLS and BUSY bits is shown in Table 2.

TABLE 2

| Bit field | Meaning |
| --- | --- |
| BUSY bit = 0; CLS bit = 0 | Corresponding slot not occupied |
| BUSY bit = 1; CLS bit = 0 | Corresponding slot occupied by vehicle with STI |
| BUSY bit = 0; CLS bit = 1 | a collision |
| BUSY bit = 1; CLS bit = 1 | a third hop for FI forwarding is reached |

In order to assure that the frame information is not forwarded more than two hops far from the transmitting vehicle, the fourth state in the CLS and BUSY bits is exploited to track the number of hops of FI forwarding.

The RR-ALOHA+ and MS-ALOHA protocols increase the number of bits of an overhead with the one bit of CLS arranged in the sub-frame information field, which in turn reduces the communication efficiency.

In order to improve communication efficiency, the present disclosure provides a method S10 for determining whether a slot is free in an Ad-Hoc network using a MS-ALOHA protocol.

Figure 3:
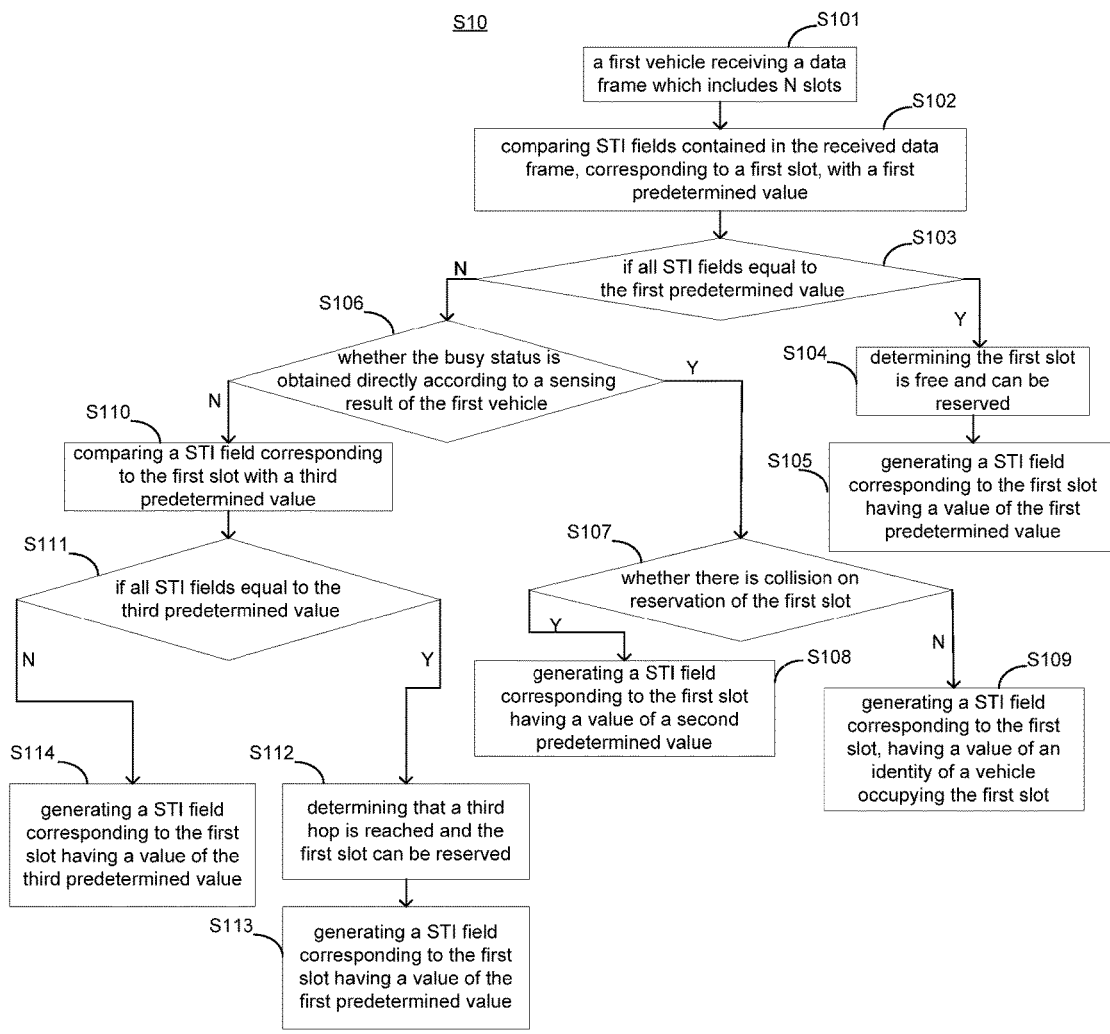
FIG. 3 illustrates a schematic flow chart of a method S10 for determining whether a slot is free in an Ad-Hoc network using a MS-ALOHA protocol according to one embodiment of the present disclosure.

Referring to FIG. 3, in S101, a first vehicle receiving a data frame which includes N slots. N is a positive integer greater than two. If a first vehicle needs to transmit, it receives a data frame, or sense a channel to determine whether there is a free slot can be reserved.

Figure 4:
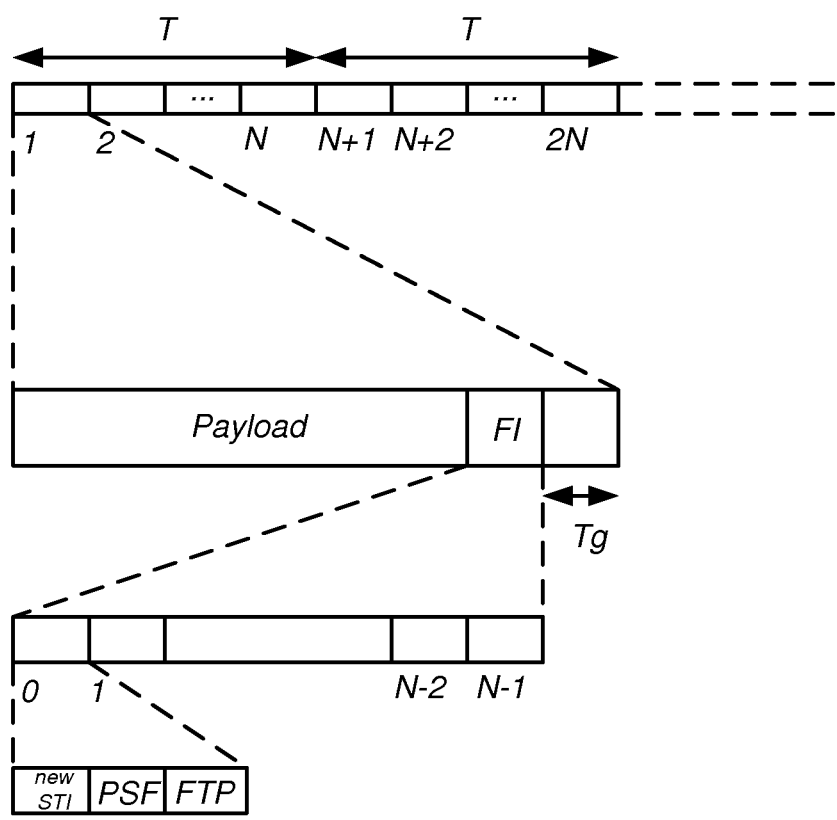
FIG. 4 illustrates a schematic data frame structure of the RR-ALOHA protocol according to one embodiment of the present disclosure.

FIG. 4 illustrates a schematic data frame structure of RR-ALOHA protocol according to one embodiment of the present disclosure. The data frame structure in FIG. 4 is similar to that in FIG. 1 other than the structure of a sub-frame information field. With reference to FIG. 4, each sub-frame information field may include a "new STI" field, where a specific value in the "new STI" is reserved for indicating a corresponding slot is free. That is, the status of a slot being free or not and identity of a vehicle occupying the slot can be indicated using a same bit field with different values. Thus the BUSY bit can be omitted.

In practice, not all values of the STI field are fully used because there are generally not the at-most vehicles, e.g., 256, in communication in the network at the same time. Based on this fact and in order to improve communication efficiency, it is applicable that a value of the STI may be predetermined for indication of a slot's free status. In this way, a STI field of a sub-frame information field not only can indicate which vehicle occupies a corresponding slot if the slot is occupied, but also can indicate the slot being Free using a predetermined value if the slot is not occupied.

In S102, comparing STI fields contained in the received data frame, corresponding to a first slot, with a first predetermined value. The first predetermined value represents the status of free.

As described above, a STI field includes n bits, which results in $2^n$, e.g., 256 different values. In some embodiments, the first predetermined value may be any one of the $2^n$ different values, for indicating a corresponding slot is free. For example, the first predetermined value may be set as, e.g., all-zero "00000000", while the other values of the STI field, like "00000001" to "11111111", may be used to indicate the identity of a vehicle occupying a slot.

In S103, determining if all STI fields equal to the first predetermined value. If all STI fields corresponding to the first slot equal to the first predetermined value, the method goes to S104, determining the first slot is free and can be reserved.

If all STI fields, for indicating which vehicle occupies the first slot, equal to the first predetermined value, the first slot is determined to be free. Otherwise, the first slot is determined to be busy, where the value of the STI field may indicate identity of a vehicle occupying the first slot. In this way, vehicles in the network can know occupation state of a slot only according to a STI field.

In S105, generating a STI field corresponding to the first slot having a value of the first predetermined value. As the first slot is determined to be free, the first vehicle may forward the free status of the first slot on a slot reserved by the first vehicle. In some embodiments, if the first vehicle needs to reserve a slot for transmission, it may generate a STI field corresponding to the first slot having a value which indicates identity of the first vehicle, and transmit on the first slot.

In some embodiments, if there are exactly or more than 256 vehicles communicating in the network, the eight-bit STI field may not be enough. In this case, the STI field may be extended to nine or more bits. Thus, at most 511 vehicles may be communicating in the network at the same time in the nine-bit case, while the control overhead remains the same as in eight-bit case of the conventional techniques. Therefore, the communication efficiency may be further improved without increasing bits of control overhead.

If not all STI fields corresponding to the first slot, equal to the first predetermined value, the first slot is determined to be busy. Then, the method goes to S106, determining whether the busy status is obtained directly according to a sensing result of the first vehicle. If yes, the method goes to S107.

In S107, determining whether there is collision on reservation of the first slot. For example, if the received STI fields corresponding to the first slot, have different values which indicate identities of different vehicles, respectively, it means there are different vehicles occupying the first slot. Thus a collision is detected.

If there is collision on reservation of the first slot, the method goes to S108, generating a STI field corresponding to the first slot having a value of a second predetermined value. The second predetermined value represents the status of collision. Specifically, the second predetermined value may be used to indicate there is collision on reservation of a slot, which is different from the first predetermined value. In some embodiments, the second predetermined value may be selected as, for example, "00000001".

If no collision is detected, that is, all the received STI fields corresponding to the first slot, have a same value which indicate there is only one vehicle occupying the first slot, the method goes to S109, generating a STI field corresponding to the first slot, having a value of an identity of a vehicle occupying the first slot.

If the busy status is not obtained directly according to the first vehicle's sensing result, that is, the busy status is determined according to the received FIs, the method S10 goes to S110, comparing a STI field corresponding to the first slot with a third predetermined value. The third predetermined value represents the status of hop limit reached.

The third predetermined value may be used to indicate whether a hop limit for forwarding the frame information is reached, to assure that the frame information is not forwarded more than two-hop far from the transmitting vehicle. The first, second, and third predetermined values may be set different from each other.

In S111, determining if all the STI fields equal to the third predetermined value. If all the received STI fields corresponding to the first slot equal to the third predetermined value, the method goes to S112, determining that a third hop is reached and the first slot can be reserved.

In some embodiments, the third predetermined value may be selected as, for example, "00000010". For example, if all the STI fields corresponding to the first slot, equal to the third predetermined value, e.g., "00000010", it means a third hop is reached. Accordingly, the first vehicle may determine the first slot is free and can be reserved. It should be noted that the choices of the first, second and third predetermined values are presented for examples, which is not intended to limit the scope of the disclosure.

In S113, generating a STI field corresponding to the first slot having a value of the first predetermined value. As the first slot is determined to be free in S112, the first vehicle may forward the free status of the first slot on a slot reserved by the first vehicle. In some embodiments, if the first vehicle needs to reserve a slot for transmission, it may generate a STI field corresponding to the first slot having a value which indicates identity of the first vehicle, and transmit on the first slot.

In S114, generating a STI field corresponding to the first slot having a value of the third predetermined value. If not all the STI fields corresponding to the first slot equal to the third predetermined value, the first vehicle may generate a STI field corresponding to the first slot, equal to the third predetermined value, and forward this frame information.

According to the method S10 above, there is no need for the CLS and BUSY bits in the RR-ALOHA based protocols. Therefore, the Ad-Hoc network can accommodate larger payload or more vehicle nodes, thereby improving the communication efficiency.

In one embodiment, a system for determining whether a slot is free in an Ad-Hoc network using a RR-ALOHA based protocol is provided. In one embodiment, a system for generating a source temporary identifier field in an Ad-Hoc network using a RR-ALOHA based protocol is provided. The systems can determine whether a slot is free only based on its received source temporary identifier fields.

The systems described above may be mounted on a vehicle, which may include a communication device and a processing device. The communication device is adapted for receiving data frames, where a data frame includes N slots, where N is a positive integer greater than two, where a slot includes a payload and a frame information field, where a frame information field includes N sub-frame information fields which correspond to the N slots, respectively, where a sub-frame information field includes a source temporary identifier field for indicating which node occupies its corresponding slot.

In some embodiments, the processing device may be configured to perform S101 to S114 of the method S10. In some embodiments, the processing device may be a CPU, a GPU, a DSP etc, or any combination thereof.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for determining whether a slot is free in an Ad-Hoc network using an RR-ALOHA based protocol, comprising:

receiving a data frame that comprises N slots, where N is a positive integer greater than two, where each slot comprises a payload and a frame information field, where each frame information field comprises N sub-frame information fields that correspond to the N slots, respectively, and where each sub-frame information field comprises a source temporary identifier field for indicating which node occupies the slot corresponding to the source temporary identifier; and determining that a slot corresponding to a first source temporary identifier is free and can be reserved, if the first source temporary identifier field contained in the received data frame equals to a first predetermined value representing a status of free.

2. A method for determining whether a slot is free in an Ad-Hoc network using a RR-ALOHA based protocol, comprising:

receiving a data frame which comprises N slots, where N is a positive integer greater than two, where each slot comprises a payload and a frame information field, where each frame information field comprises N sub-frame information fields that correspond to the N slots, respectively, and where each sub-frame information field comprises a source temporary identifier field for indicating which node occupies the slot corresponding to the source temporary identifier; and determining that a first slot is free and can be reserved, if all source temporary identifier fields corresponding to the first slot, contained in the received data frame, are equal to a first predetermined value representing a status of free.

3. The method according to claim 2, further comprising determining that there is collision with respect to reserving the first slot, if a source temporary identifier field corresponding to the first slot, contained in the received data frame, equals a second predetermined value representing the status of collision.

4. The method according to claim 2, further comprising determining that a hop limit has been reached and the first slot can be reserved, if all source temporary identifier fields corresponding to the first slot, contained in the received data frame, equal a third predetermined value representing the status of hop limit reached.

5. The method according to claim 4, where the hop limit is a third hop.

6. The method according to claim 2, where the RR-ALOHA based protocol is one of an RR-ALOHA protocol, an RR-ALOHA+ protocol and an MS-ALOHA protocol.

7. A method for generating a source temporary identifier field in an Ad-Hoc network using a RR-ALOHA based protocol, comprising:

a first node receiving a data frame which comprises N slots, where N is a positive integer greater than two, where each slot comprises a payload and a frame information field, where each frame information field comprises N sub-frame information fields that correspond to the N slots, respectively, and where each sub-frame information field comprises a source temporary identifier field for indicating which node occupies the slot corresponding to the source temporary identifier; and if all source temporary identifier fields corresponding to a first slot, contained in the received data frame, indicate that the first slot is free, generating a first source temporary identifier field corresponding to the first slot and having a first predetermined value representing a status of free, where the first source temporary identifier field is to be transmitted in a second slot reserved by the first node.

8. The method according to claim 7, further comprising, if a first source temporary identifier field contained in the received data frame indicates that a first slot is occupied by a second node and a second source temporary identifier field contained in the received data frame indicates that the first slot is occupied by a third node, generating a second source temporary identifier field corresponding to the first slot having a second predetermined value representing a status of collision, where the second source temporary identifier field is to be transmitted in a second slot reserved by the first node.

9. The method according to claim 7, where, if all the source temporary identifier fields corresponding to the first slot equal a first predetermined value representing a status of free, or, if all the source temporary identifier fields corresponding to the first slot equal a third predetermined value representing the status of hop limit reached, or, if some of the source temporary identifier fields corresponding to the first slot equal the first predetermined value and remaining source temporary identifier fields corresponding to the first slot equal a third predetermined value, then the first slot is free.

10. The method according to claim 9, where the hop limit is a third hop.

11. The method according to claim 7, where the RR-ALOHA based protocol comprises one of an RR-ALOHA protocol, an RR-ALOHA+ protocol and an MS-ALOHA protocol.

12. A system for determining whether a slot is free in an Ad-Hoc network using an RR-ALOHA based protocol, comprising:
  a communication device for receiving data frames, where N is a positive integer greater than two, where each slot comprises a payload and a frame information field, where each frame information field comprises N sub-frame information fields that correspond to the N slots, respectively, and where each sub-frame information field comprises a source temporary identifier field for indicating which node occupies the slot corresponding to the source temporary identifier; and
  a processing device configured to determine that a first slot is free and can be reserved if all source temporary identifier fields corresponding to the first slot, contained in a data frame received by the communication device, are equal to a first predetermined value representing a status of free.

13. The system according to claim 12, where the processing device is further configured to, if a source temporary identifier field corresponding to the first slot, contained in the received data frame, equals to a second predetermined value representing the status of collision, determine that there is collision with respect to reserving the first slot.

14. The system according to claim 12, where the processing device is further configured to, if all source temporary identifier fields corresponding to the first slot, contained in the received data frame, equal to a third predetermined value representing the status of hop limit reached, determine that a hop limit has been reached and the first slot can be reserved.

15. The system according to claim 14, where the hop limit is a third hop.

16. A system for generating a source temporary identifier field in an Ad-Hoc network using a RR-ALOHA based protocol, comprising:
  a communication device for receiving data frames, where N is a positive integer greater than two, where each slot comprises a payload and a frame information field, where each frame information field comprises N sub-frame information fields that correspond to the N slots, respectively, and where each sub-frame information field comprises a source temporary identifier field for indicating which node occupies the slot corresponding to the source temporary identifier; and
  a processing device configured to generate a first source temporary identifier field corresponding to a first slot having a first predetermined value representing a status of free, where the first source temporary identifier field is to be transmitted in a second slot reserved by a node on which the system is mounted, if all source temporary identifier fields corresponding to the first slot, contained in a data frame received by the communication device indicate that the first slot is free.

17. The system according to claim 16, where the processing device is further configured to, if a first source temporary identifier field contained in the received data frame indicates that the first slot is occupied by the first node, and a second source temporary identifier field contained in the received data frame indicates that the first slot is occupied by a second node, generate a first source temporary identifier field corresponding to the first slot and having a second predetermined value representing the status of collision, where the first source temporary identifier field is to be transmitted in a second slot reserved by the node.

18. The system according to claim 16, where, if all the source temporary identifier fields corresponding to the first slot equal a first predetermined value representing a status of free, or, if all the source temporary identifier fields corresponding to the first slot equal a third predetermined value representing the status of hop limit reached, or, if some of the source temporary identifier fields corresponding to the first slot equal the first predetermined value and remaining source temporary identifier fields corresponding to the first slot equal a third predetermined value, then the first slot is free.

19. The system according to claim 18, where the hop limit is a third hop.

20. The system according to claim 16, where the RR-ALOHA based protocol comprises one of an RR-ALOHA protocol, an RR-ALOHA+ protocol and an MS-ALOHA protocol.

* * * * *

UNITED STATES PATENT AND TRADEMARK OFFICE
CERTIFICATE OF CORRECTION

| | | |
|---|---|---|
| PATENT NO. | : 9,820,305 B2 | Page 1 of 1 |
| APPLICATION NO. | : 14/773719 | |
| DATED | : November 14, 2017 | |
| INVENTOR(S) | : Zeng Yang, Qingshan Zhang and Guoxia Zhang | |

It is certified that error appears in the above-identified patent and that said Letters Patent is hereby corrected as shown below:

On the Title Page

(73) Assignee:
Please delete "HARMAN INTERNATIONAL INDUSTRIES, INCORPORATION" and insert
--HARMAN INTERNATIONAL INDUSTRIES, INC--.

Signed and Sealed this
Thirtieth Day of July, 2019

Andrei Iancu
*Director of the United States Patent and Trademark Office*